(No Model.) 2 Sheets—Sheet 2.
F. M. MOULTON.
ROAD MAKING MACHINE.
No. 281,715. Patented July 24, 1883.
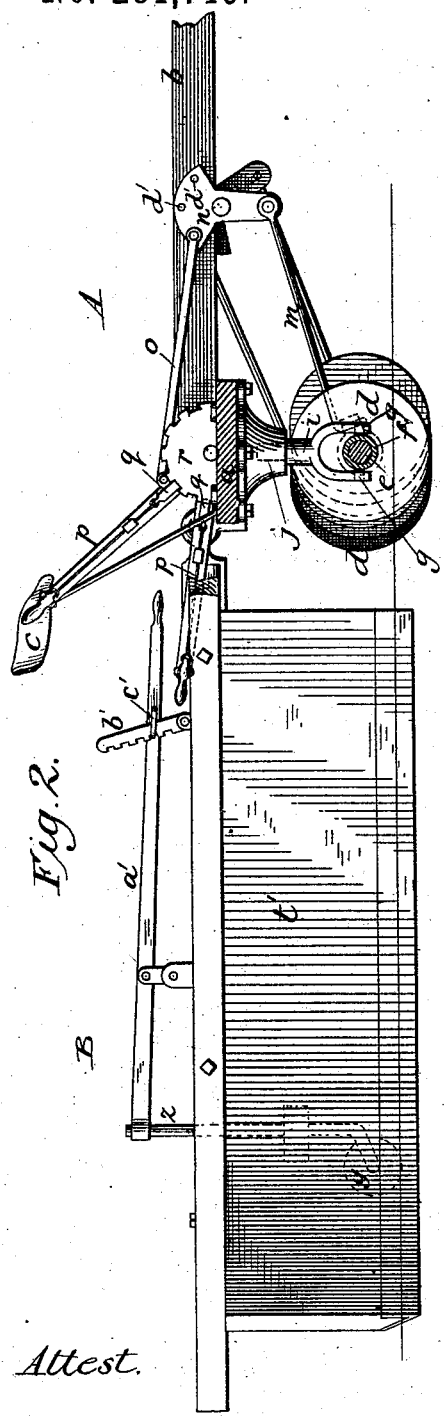
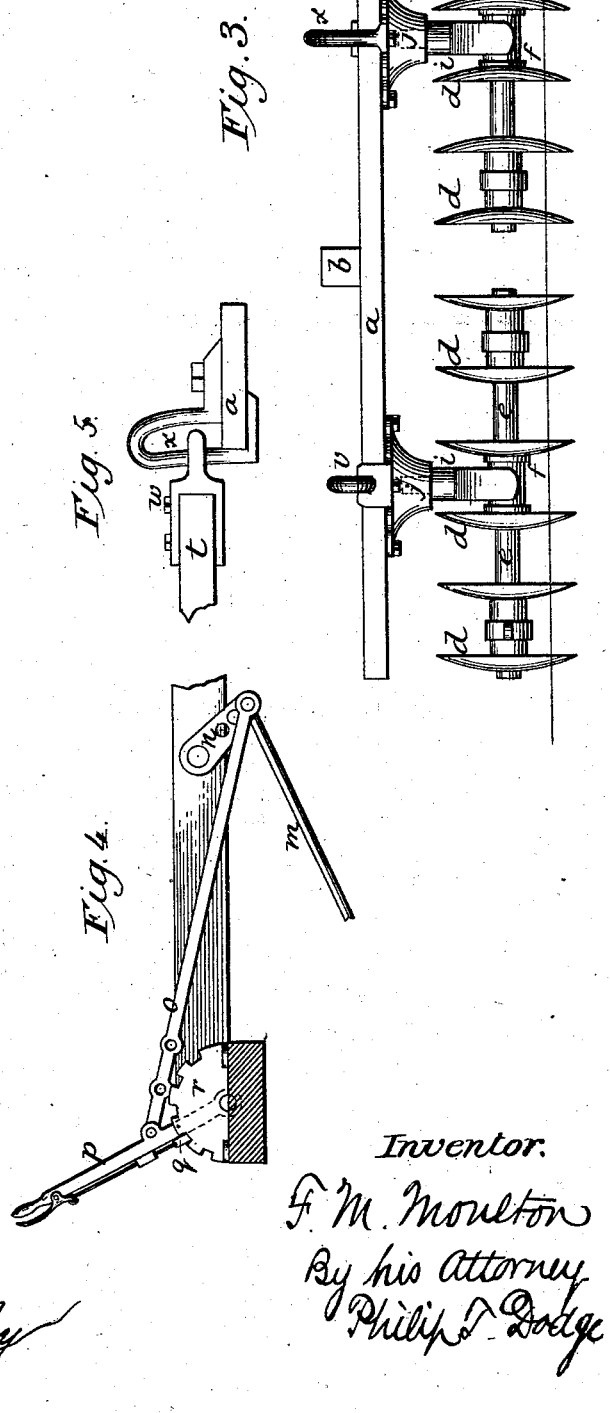
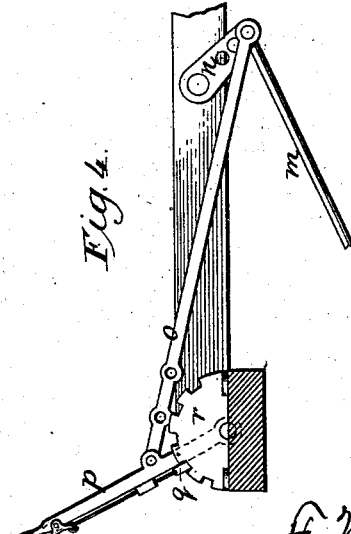
Attest.
Sidney P. Hollingsworth
William H. Shipley
Inventor.
F. M. Moulton
By his Attorney
Philip T. Dodge

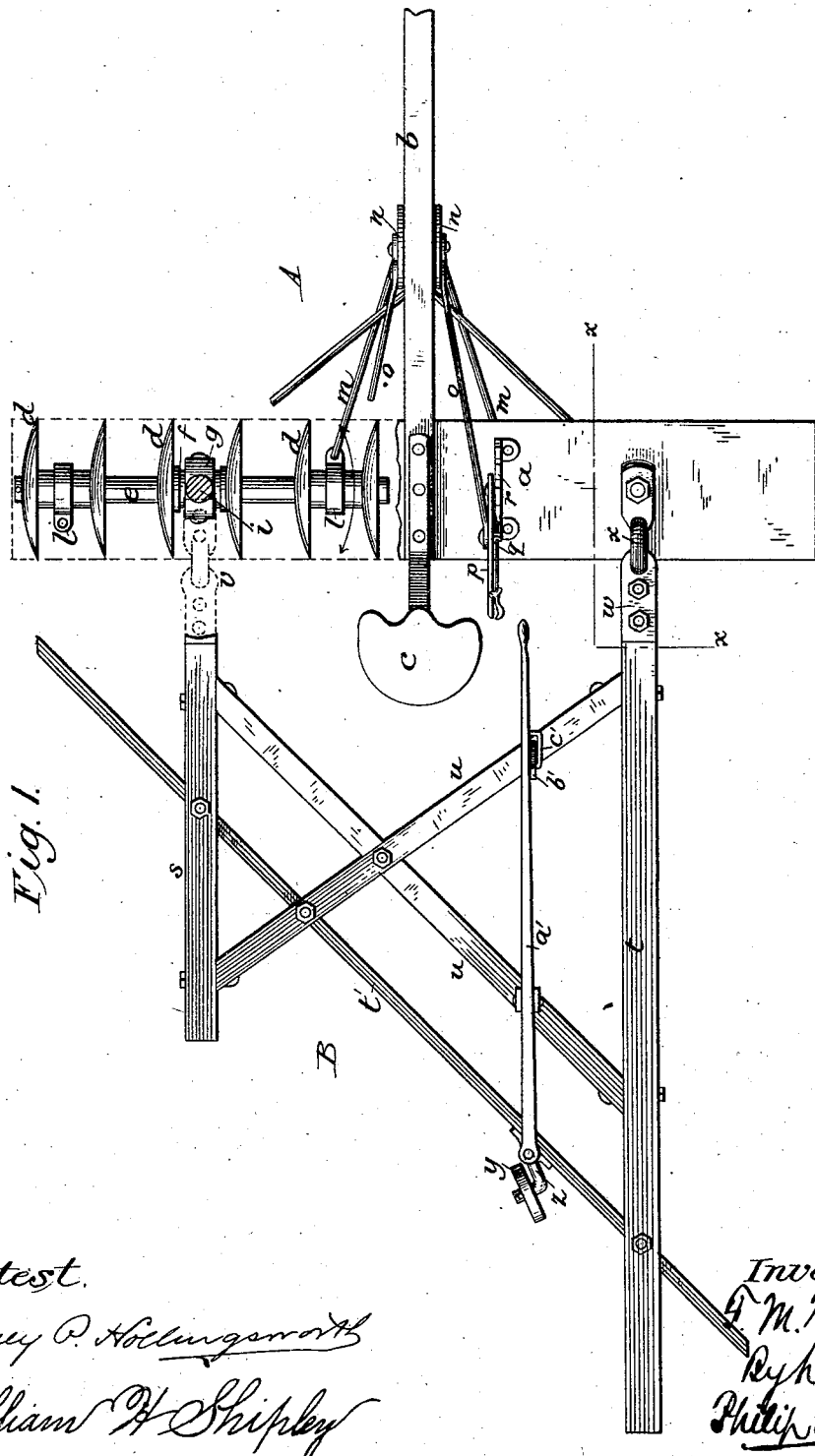

UNITED STATES PATENT OFFICE.

FORDYCE M. MOULTON, OF VERGENNES, VERMONT, ASSIGNOR TO SAMUEL B. IVES, OF SAME PLACE, AND HIRAM NORTON, OF ADDISON, VERMONT.

ROAD-MAKING MACHINE.

SPECIFICATION forming part of Letters Patent No. 281,715, dated July 24, 1883.

Application filed October 2, 1882. (No model.)

*To all whom it may concern:*

Be it known that I, FORDYCE M. MOULTON, of Vergennes, in the county of Addison and State of Vermont, have invented certain Improvements in Road-Making Machines, of which the following is a specification.

My invention relates to a machine intended more particularly for the construction of road-beds, and designed to perform the two operations of loosening and of leveling or grading the road.

To this end the invention consists, essentially, in the combination of a front frame provided with rotary cutters or disks and a rear frame provided with a diagonal scraper, the two being constructed and united in a manner hereinafter described.

The invention also relates to various details of secondary importance, which will be hereinafter described.

Referring to the accompanying drawings, Figure 1 represents a top plan view of the machine, the draft-frame being broken away at one end in order to expose the parts therein. Fig. 2 is a side elevation of the machine, presented partly in section, on the line $x\,x$, Fig. 1. Fig. 3 is a rear elevation of the front frame and its cutters. Fig. 4 is a view of a modification. Fig. 5 is a view illustrating the construction of the loose joint uniting the front and rear frames.

Referring to the drawings, A represents the front or draft frame, by which the cutters are carried; and B, the rear frame, jointed thereto, and carrying the oblique scraper. The front frame, A, consists of a transverse bar or plank, $a$, provided at the center with a rigid forwardly-extending draft-pole or tongue, $b$, and also provided with a central seat, $c$, to carry the driver or attendant. Under each end of the front frame I mount a series of concavo-convex cutter wheels or disks, $d$. There may be any suitable number of disks in each set. As shown in the drawings, each series of disks is carried by a horizontal shaft, $e$, upon which the disks are placed with their convex faces in the same direction. Each of these carrying-shafts $e$ is provided at the center with a sleeve or collar, $f$, which is connected by horizontal trunnions or journals $g$ to the lower forked end of a supporting-head, $i$, the upper end of which is journaled vertically within a bearing-plate or support, $j$, bolted to the under side of the frame. It will be perceived that the above method of connection permits the shaft $e$ to rotate freely in its supporting-sleeve, that the trunnions $g$ admit of the shaft rising and falling at its ends, as may be required, in order to permit the disks to follow inequalities in the surface of the ground, and that the connection of the forked heads by the vertical journal to the supporting-plates admits of the shafts swinging or turning horizontally. By this horizontal motion of the shafts they may be set at a greater or less angle to the line in which the machine advances, so as to cause the disks to stand with greater or less obliquity to their line of draft. The connection also permits the shafts to be turned horizontally end for end, in order that the disks may be arranged with their convex sides toward the center or toward the outer side of the head, as the nature of the soil and the character of the surface may render advisable.

For the purpose of controlling the horizontal position of the shafts, and thereby the obliquity of the cutters, each shaft $e$ is provided at or near its two ends with loose collars $l$, having on one side a perforated eye or ear. The collar at the inner end of each shaft receives the rear hooked end of a rod, $m$, which extends thence forward to the lower end of a pivoted plate or lever, $n$, mounted on the side of the tongue. From the upper end of this plate or lever $n$ a rod, $o$, is extended backward to a hand-lever, $p$, mounted upon the frame in such relation to the seat as to be readily operated by the attendant. The lever-connections to the two shafts are duplicates of each other, and are entirely independent, so that the operator may adjust each shaft and its series of disks without changing the position of the other.

For the purpose of locking the shafts in position, the hand-levers are provided with locking-dogs $q$, arranged to engage in notched sector-plates $r$ on the main frame, the dogs being operated through a connecting-rod from a hand-lever or latch on the upper end of the hand-lever, as shown, the arrangement being a common one and familiar to every skilled mechanic.

Passing now to the scraper-frame, it will be seen to consist of two longitudinal timbers, s and t, connected by cross-braces u. To the under side of this frame the oblique scraper t' is rigidly bolted and braced, this scraper consisting of a flat wooden board armed with metal at the edge, or of a sheet-metal plate, as preferred. Ordinarily the scraper is made of a flat form, as represented; but it may be varied in shape to a limited extent, if desired. The scraper-frame is attached to the front or draft frame by connections constructed in such a manner as to allow a limited independent motion, in order that it may conform to irregularities or inequalities in the surface of the ground. The connections for securing this independent motion of the two frames may be of any suitable character; but it is preferred to adopt the construction shown in the drawings, wherein the beam s of the scraper-frame is connected to the main frame by means of an eyebolt, v, while the other beam, t, of the scraper-frame is provided with a plate, w, arranged to slide vertically upon a rod or arm, x, bolted firmly to the front frame, as shown. This connection of the beam t permits one side of the scraper-frame to rise and fall independently of the front frame, but the double connections between the two frames compel the scraper-frame to follow in a direct line behind the cutters.

For the purpose of controlling the depth to which the scraper enters the ground when in action, and also for the purpose of sustaining the same clear of the ground when the machine is being turned or transported from place to place, I mount upon the rear side of the scraper a trailing-wheel, y, carried by an upright rod, z, working in suitable guides or bearings. The upper end of this rod z is connected to a hand-lever, a', pivoted upon the scraper-frame and extended forward within reach of the driver. By adjusting this lever the driver may, without dismounting, control the position of the scraper as required.

In order to retain the roller or trailing-wheel in the required adjustment with respect to the scraper, any suitable locking device may be employed in connection with the lever a', a simple and effective device being that shown in the drawings, consisting simply of a notched pivoted link, b', mounted on the scraper-frame, and extending upward with and engaging with a staple, c', on the side of the hand-lever.

In the event of its being required to reverse the position of the cutters, it is only necessary to unhook the operating-rods m from their collars, whereupon the shafts e may be revolved end for end, after which the operating-rods are engaged with those collars l which are brought inward by the rotation of the shaft.

As it is sometimes desirable to change the position in which the operating-levers p stand—as, for example, to throw them backward to a horizontal position in the event of the scraper being detached, so that the operator may control the lever while walking behind the cutter-frame—I make provision for thus changing the operative positions of the levers. In Figs. 1 and 2, I secure the end sought by widening the upper ends of the levers n and providing the same with a series of holes, d', to receive the forward end of the rod o. By changing the connection of the rod from one to another of these holes the position of the lever may be widely varied. An equivalent for the same purpose is that represented in Fig. 4, in which the rear end of the rod o is constructed with a number of holes, connection of the lever being made at different points thereon.

In place of employing the centrally-pivoted levers n as a connection between the rods o and m, a swinging link may be employed, as shown in Fig. 4. In this case the rods m and o may be connected to the link at one end of the same and supported by means of the link; or they may be connected to the link, which is provided with a series of holes for the purpose at different points, in which event the relative movement of the rods o and n may be varied to give the operator greater or less leverage upon the shaft.

A machine constructed on my plan may be employed not only in the construction of new roads, but also in making repairs upon old roads. The various adjustments of which it is susceptible adapt it for breaking up and leveling irregular surfaces, for removing earth from previously-plowed furrow at the side of the roadway toward the middle of the same, and distributing it thereon evenly or with increased height at the center. In short, the machine will serve to loosen, convey, and distribute earth in all the various directions and conditions required.

In using the machine under certain conditions, particularly when moving earth from the side to the center of a road, and in moving earth from furrows in hard clay soil, I find it sometimes advisable to remove one series of the rolling colters or cutters, usually those on the left-hand side of the machine.

Having thus described my invention, what I claim is—

1. The draft-frame provided with the two series of rotary disks or cutters and means, substantially as described, for adjusting the same, in combination with the rear frame, provided with the oblique scraper, and connected to the front frame by joints permitting a limited independent motion, substantially as described and shown.

2. The combination of the front frame, provided with the adjustable rotary cutters, as described, the rear frame jointed thereto, the scraper, and the adjustable wheel for controlling the elevation of said frame.

3. The combination of the front frame provided with the adjustable cutters and the driver's seat, the rear frame jointed to the front frame, the scraper, the sustaining-wheel $y$, and the hand-lever $a'$, connected with said wheel, and extending forward to a point adjacent to the driver's seat, substantially as shown and described.

4. In combination with the front frame, having the rotary cutters mounted thereunder, the rear scraper-frame connected to the front frame on one side by the eyebolt or swivel-connection $v$, and on the opposite side by the vertically-sliding joint $w$.

5. In combination with the draft-frame, the shaft $e$, provided with the rotary cutters, the sleeve $f$, mounted upon said shaft, and the forked head $d$, pivoted vertically to the draft-frame and horizontally to the sleeve, as described and shown, whereby a universal motion of the shaft and cutters is permitted.

6. The front frame and the reversible cutter-shaft $e$, provided with collars $l$ at its two ends, in combination with the detachable controlling-rod $m$ and a hand-lever, $p$, connected with said rod by intermediate devices, substantially as described.

7. In combination with the draft-frame and the horizontally-swinging cutter-shaft $e$, the hand-lever $p$, and devices, substantially as shown, connecting the hand-lever with the shaft, said devices provided with means, as set forth, to permit the adjustment of the lever forward and backward in respect to said intermediate connections, whereby the lever may be adjusted in position to be operated from the rear of the machine, as required.

8. In a machine for constructing and repairing roads, the combination of a front frame, a rear frame jointed thereto, and provided with a diagonal scraper, and two series of rolling cutters jointed or swiveled to the opposite end of the front frame, one of said series being removable independently of the other.

FORDYCE M. MOULTON.

Witnesses:
SAML. S. GAINES,
JOHN A. GRAVELL.